March 17, 1970 F. J. KOHOUT 3,500,529
RING APPLYING APPARATUS
Filed Sept. 2, 1966 2 Sheets-Sheet 1

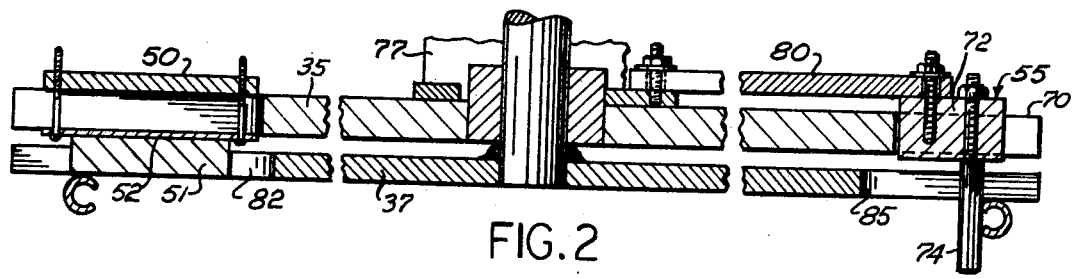
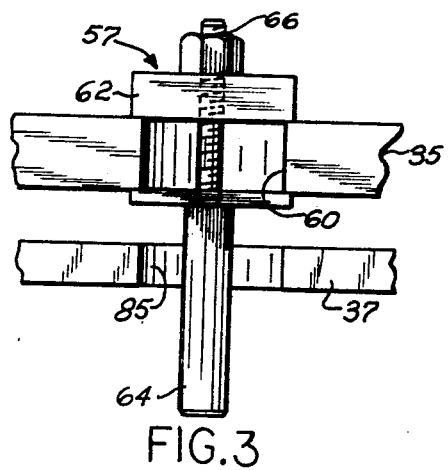
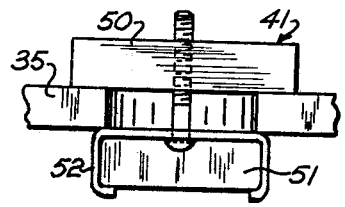
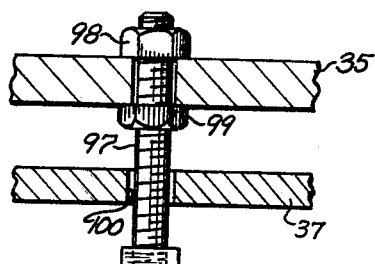
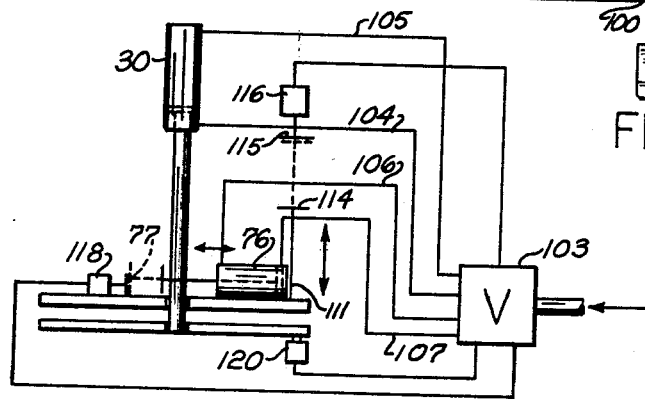

United States Patent Office 3,500,529
Patented Mar. 17, 1970

3,500,529
RING APPLYING APPARATUS
Frank J. Kohout, Pepper Pike, Ohio, assignor to Drum Parts, Inc., Cleveland, Ohio, a corporation of Ohio
Filed Sept. 2, 1966, Ser. No. 576,937
Int. Cl. B23p 19/08
U.S. Cl. 29—229                             7 Claims

ABSTRACT OF THE DISCLOSURE

Apparatus for assembling a split cover clamping ring on a periphery of a drum-like container includes a ring carrier on which a resilient split ring is positioned for placement on a container, ring expanding structure for expanding the ring to a diametrical size greater than the size of the container, and a ring releasing means operable to move the expanded ring onto the container.

---

The present invention relates to apparatus for manufacturing containers and more particularly relates to apparatus for applying a clamping ring to a drum-like container.

An object of the present invention is the provision of a new and improved apparatus for applying a split clamping ring to a periphery of a drum-like container which is adapted for use in an automated production line, which is easily manipulatable by a single operator and which is effective to apply split clamp rings to the periphery of a drum-like container with greater speed than has been obtainable by the use of prior art devices.

Another object of the present invention is the provision of a new and improved apparatus for applying a split clamping ring to a periphery of a drum-like container and which includes a first member for supporting the ring in a relaxed condition relative to the container and which is operable to expand the diametrical extent of the ring and move the ring to a position adjacent the container, and a second member interposed between the first member and the ring and which is movable to remove the ring from the first member and transfer the ring from the first member to the periphery of the container and which is constructed and arranged so that the expanded ring is transferred directly from the first member to the periphery of the container and permitted to contact about the periphery of the container.

Another object of the present invention is the provision of a new and improved apparatus for applying a split clamping ring to a periphery of a drum-like container and which includes a first member for supporting the split clamping ring relative to the container, the first member operable to hold a split ring thereon in a relaxed condition and to expand the diametrical extent of the ring supported thereon, a second member interposed between the ring and the first member when the ring is supported thereon and which is operable to move relative to the first member and strip the split ring therefrom and move the ring into engagement with the periphery of the container and means cooperating with the members to provide for articulated operation of the first and second members.

Further objects and advantages of the present invention will become apparent to persons skilled in the art to which this invention relates from a consideration of the following detailed description of a preferred embodiment thereof and from the drawings which form a part of the specification and in which:

FIG. 2 is a sectional view taken approximately at line 2—2 of FIG. 1;

FIG. 3 is a fragmentary elevational view taken approximately at line 3—3 of FIG. 1;

FIG. 4 is a sectional view taken approximately at line 4—4 of FIG. 1;

FIG. 5 is a fragmentary elevational view taken approximately at line 5—5 of FIG. 1; and FIG. 6 is an illustration of a portion of the ring applying apparatus as shown in FIG. 1.

Figure 1:
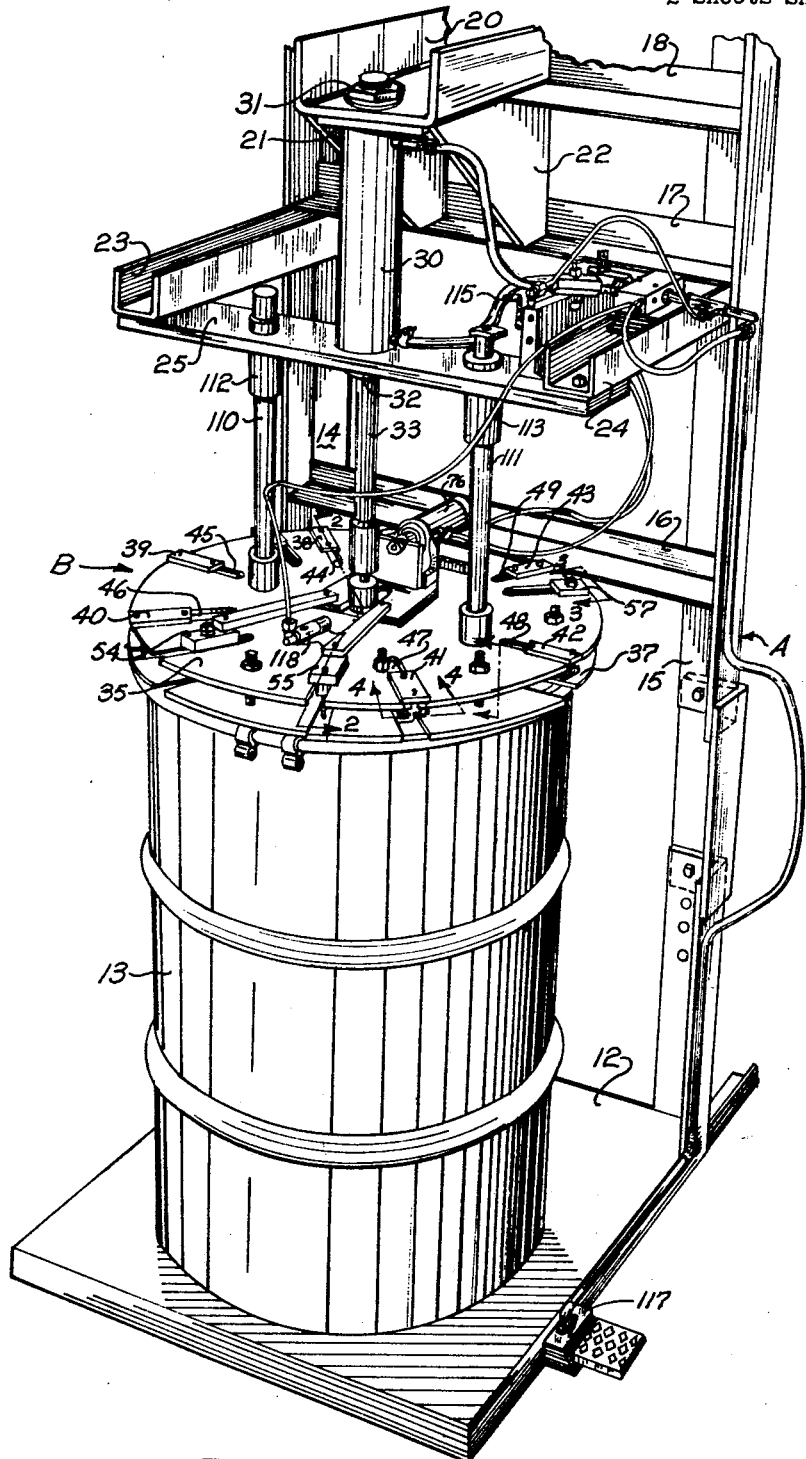
FIG. 1 is a perspective view of a ring applying apparatus embodying the present invention.

The present invention provides an improved apparatus for cyclically applying split clamping rings to drum-like containers. A ring applier apparatus embodying the present invention is particularly useful in applying a clamping ring to an upper pheriphery of a drum for the purpose of holding a cover member in engagement with an end of the drum to prevent fluent materials deposited in the container from escaping therefrom. A ring applying apparatus of the character referred to is operable to support a relaxed clamping ring in spaced relation to the top of the container and expand the diametrical extent of the ring to a size larger than the diametrical extent of the container, move the ring to a position adjacent the top of the container and move the ring into engagement with the periphery of the container. When the expanded ring has been moved into engagement with the container, the ring applying apparatus is operative to automatically return to its first position for reception of another ring.

The ring applying apparatus shown for purposes of illustrating the present invention includes a frame A constructed from a plurality of members including a base member 12 which is constructed to support a drum-like container 13 thereon and having rear corners to which a pair of vertically upstanding frame members 14, 15 are fixed. The frame members 14, 15 are steel angles welded to the base 12 and supported in spaced parallel relation by cross bars 16, 17, 18. The cross bars 16, 17, 18 are preferably steel angles fixed to the frame members 14, 15. The cross bars 17, 18 form a support for a channel 20 which extends horizontally from the cross bar 18. The channel 20 is positioned with its flanges extending vertically and its web forming a lower side thereof. The channel is braced against vertical bending by a pair of generally triangular support members 21, 22 which are fixed to the cross bars 17, 18 and the channel 20 at its lower side.

The frame members 14, 15 support a pair of horizontally extending channel members 23, 24 welded thereto with their open sides facing upwardly and which are connected together at their projecting ends by a platelike cross arm 25. The cross arm 25 has an aperture located medially of its ends which is vertically aligned with an aperture formed in the horizontally extending channel 20. A fluid operated actuator 30 is disposed between the cross arm 25 and channel 20 and is secured in the aligned apertures by suitable fasteners 31, 32.

The actuator 30 is of the double acting piston-cylinder type and is preferably pneumatically actuated. The actuator 30 includes a piston rod 33 extending downwardly therefrom and which is movable longitudinally to raise and lower a ring applier assembly B, operatively associated with the lower end thereof. As shown in FIG. 1, the ring applier assembly B is in its lowered position. The ring applier assembly B includes a ring supporting member 35 and a ring stripper member 37. The ring supporting member 35 has a central opening therein through which the piston rod 33 extends and the opening is of such dimension that the piston rod is freely movable relative to the ring support member 35. The piston rod 33 is rigidly secured to the stripper member 37 so that upon upward movement of the piston rod 33 in response to energization of the actuator 30, the stripper ring 37 will carry the ring support member 35 therewith.

The ring support member 35 includes a plurality of magnetic holding assemblies 38–43 which are disposed in radially directed slots 44–49 formed in the periphery of the ring supporting means. Each of the magnetic holding assemblies 38–43 are identical in construction and therefore only one will be described in detail herein.

The magnetic holding assembly 41 includes a plate 50 positioned on the upper side of the ring support member 35 and a magnet 51 which is spaced from a lower side of the ring support member 35 and held by a bracket member 52. The magnet and bracket are connected to the plate 50 by screws which extend through the bracket member 52 and are threaded into the plate 50. The magnets are of sufficient strength to insure that a clamping ring 36 may be readily held thereto on the lower side of the ring applier assembly B. Permanent magnets have been illustrated, but it should be apparent that electromagnets could be suitably used.

The ring support member 35 additionally includes four circumferentially spaced ring engaging assemblies 54–57 which are operable to engage and expand the clamping ring 36 which is magnetically supported on the ring applier assembly B. The ring engaging assemblies 56, 57 are identical and therefore only one will be described in detail. The ring engaging assembly 57 is disposed in a radial slot 60 formed in the periphery of the ring support member 35 and includes a clamping block 62 secured to a downwardly extending pin member 64 by a bolt and nut fastener 66. The radial position of the ring engaging assembly 57 may be adjusted by loosening the fastener 66 and sliding the assemblies radially in the slot 60.

The ring engaging assemblies 54, 55 are also identical so that only the assembly 55 will be described. The ring engaging assembly 55 is disposed in a radial slot 70 formed in the ring supporting member 35 and includes a block 72 which is slidable in the slot 70 and supports a downwardly extending pin member 74. The ring engaging assembly 55 is slidable in the slot 70 in response to movement imparted thereto by an actuator 76. The actuator 76 is secured to the ring supporting member 35 and is of the double acting piston-cylinder type, and preferably pneumatically operated. The actuator 76 imparts movement to a slide member 77 to which a push rod 80 is pivotally connected. The push rod 80 is pivotally connected at its opposite end to the ring engaging assembly 55 so that upon movement of the slide 77 by the actuator 76 the assembly 55 is moved radially in the slot 70 relative to the support member 35 to expand the ring 36 supported thereon.

The ring applying assembly B is movable vertically toward and away from the drum-like container 13 by operation of the actuator 30. Raising of the ring applying assembly B away from the top of the container 13 is effected as the stripper member 37 moves in engagement with the ring support member 35 to carry the ring support member 35 upwardly therewith. The stripper member 37 is provided with a plurality of radially extending slots 82 which correspond with the slots 44–49 in the ring support member in which the magnetic holding assemblies are located. The slots in the stripper member are of such width that the magnets 51 pass freely between the sides thereof. When the stripper member 37 engages the ring support member 35, the magnets 51 are substantially flush with the lower surface of the stripper member. The stripper member additionally includes radial slots 85 located to correspond with the position of the ring engaging assemblies 54, 55, 56 and 57 and are of such width that the pin members 64, 74 of the assemblies extend freely therethrough.

The ring support member 35 additionally carries six annularly spaced stop members, each of which comprises a threaded member 97 extending through the ring support member and connected to the ring support member by nuts 98, 99. The threaded members 97 extend downwardly from the ring support member and through apertures 100 formed in the stripper member. The apertures 100 permit the members 97 to move freely therethrough relative to the stripper member. In the illustrated embodiment the stop members 97 extend downwardly from the ring support member a greater distance than to the ring engaging assemblies 54–57 and the stop members include a resilient covering on their lower ends for a purpose to be described hereinafter.

The actuators 30 and 76 are connected to a source of pressurized air through a valve 103 which controls the operation of the actuators as described above. The valve 103 is connected to hoses 104–107 which communicate pressurized air to the respective actuators. Operation of the valve 103 is controlled by a plurality of air switches, which cooperate with the valve 103 and are operable to cause the valve to be actuated at predetermined stages in the cycle of the apparatus.

As the valve 103 directs compressed air through the hose 104 to the actuator 30, the ring supporting member 35 and stripper member 37 are moved upwardly. As the piston rod 33 moves upwardly, it slides through the aperture in the ring supporting member 35 until the stripper member, which is rigidly secured to the piston rod 33, moves into engagement with the ring supporting member 35. Thereafter, the stripper member 37 carries the ring supporting member 35 upwardly therewith and the actuator 30 moves the members 35, 37 to a predetermined position above the level of a drum-like container to be supported on the base member 12. Upward movement of the ring supporting member 35 is guided by a pair of guide rods 110, 111 which are secured to the ring supporting member and which slidably extend through apertures formed in the cross arm 25. The guide rods 110, 111 are supported for sliding movement relative to the cross arm 25 by bushings 112, 113. The guide rod 111 carries an arm 114 at its upper end which engages a control arm 115 of an air switch 116. Actuation of the air switch 116 causes the valve 103 to direct compressed air to the actuator 76 to cause the ring engaging assemblies to be moved radially inwardly on the member 35.

When the stripper and ring support members have been moved to their raised position, a drum-like container 13 is moved into the support member 12 so that the container 13 is vertically aligned with the ring support and stripper members. When the container 13 is positioned relative to the ring support and stripper members, a split clamping ring is placed on the lower side of the stripper member and is held thereon by the action of the magnetic holding assemblies 38–43. The clamping ring, of course, will be in a relaxed condition when it is held by the magnetic holding assemblies.

When the clamping ring 36 has been suitably positioned on the stripper member and held thereon, an air switch 117 is actuated by the operator to cause the valve 103 to direct air through the hose 107 and to the actuator 76. The actuator 76 is caused to move the slide member 77 forwardly as viewed in the drawings, relative to the ring support member 35 which in turn causes the ring engaging assemblies 54, 55 to be moved in a radially outward direction relative to the ring support member. This movement of the ring engaging parts expands the split ring as the pin members 74, 75 engage the ring and move outwardly.

When the ring 36 has been expanded to have a diametrical extent which substantially corresponds with that of the container 13, an air switch 118 is engaged by the slide 77. The air switch 118 causes the valve 103 to direct compressed air into the hose 105 and actuator 30, moving the ring applying assembly B downwardly while maintaining pressure in the actuator 76. As the ring applying assembly B is moved downwardly, the ring supporting member 35 is carried with the stripper member 37. The ring applying member B moves downwardly until the stop members 97 engage the cover 13a of the container 13, preventing further downward movement of the ring supporting member 35. The actuator 30 continues to urge the stripper member 37, which is interposed between the ring 36 and the ring support member 35, downwardly relative to the ring support member 35 and its associated parts. As the stripper member 37 moves relative to the ring support 35, it engages the expanded ring 36, moving the ring 36 downwardly on the ring engaging parts 54–57, transferring the expanded ring from the ring engaging assemblies to the periphery of the container 13 where the ring is permitted to relax and engage the top 13a and the container 13. When the ring 36 is in engagement with the container, an air switch 120, mounted on the cross arm 16 is engaged by the stripper member 37, operating the valve 103 to direct compressed air into the hose 104 to raise the ring applying assembly B out of engagement with the container 13 and to prevent further movement of the actuator 76. When the ring applying assembly B has been raised, the container 13 with the ring 36 engaging the cover 13a and the periphery of the container is then removed from the base 12. The operation described may then be repeated.

In the embodiment of the invention shown, the ring applying assembly is linearly movable vertically into operating position over the top of the container. It is to be understood, however, that the assembly may be constructed so as to pivot about an axis at or adjacent to the rear of the apparatus. Alternatively the ring applying assembly may be fixedly secured to the frame and the drum raised into operating position therein and later lowered therefrom after the ring has been applied to the drum. In other words the assembly may be elevatably connected to the frame proper in any suitable manner or other suitable arrangements may be made for effecting relative movement between the ring applying assembly and the container to properly position the container relative to the ring applying mechanism and remove it therefrom. It is also to be understood that the apparatus of the present invention can be incorporated in an automatic assembly line wherein the controls are actuated automatically without attention from an operator, for example, by the position of a container moving along an intermittently-operated conveyor, etc.

From the foregoing description of the preferred embodiment of the invention it will be apparent that the objects heretofore enumerated and others have been accomplished and that there has been provided a novel and improved ring applying apparatus. While the preferred embodiment of the present invention has been described in considerable detail, the invention is not to be considered to be limited to the precise construction shown. The lower portions of the assembly A, that is, the base 12 and frame members 14, 15, 16, for example, are not necessary to the operation of the apparatus and may be altered, or dispensed with, depending on the characteristics of the particular assembly line with which the apparatus is to be associated, and the substitution of a suitable rigid mounting for the apparatus. Further, it should be appreciated that the particular construction and arrangement of the switches and a valve associated with the apparatus may be changed without departing from the invention, for example, the switches may be mounted on the actuators themselves and operate in response to piston movement. My intention is to cover hereby all adaptations, modifications and uses of the ring applier shown which come within the practice of those skilled in the art to which the invention relates and within the scope of the appended claims.

Having described my invention, I claim:

1. Apparatus for assembling a cover clamping split ring to the periphery of a drum-like container including: a frame; ring carrier structure movable on said frame; means on said carrier for supporting a resilient split ring in a relaxed condition at a location spaced from a drum-like container; a pair of relatively movable parts on said carrier detachably engageable with a ring and relatively movable to a position at which the ring is resiliently expanded; an actuator for effecting relative movement of said parts to said position; and means releasing said ring from said parts onto the container; said ring carrier structure including a plurality of stop members extending therefrom and which are engageable with a surface of a container to limit relative movement between said ring carrier structure and a container toward one another, said means for releasing the ring being movable relative to said ring carrier structure when relative movement between said ring carrier structure and a container is limited; and said releasing means including a member interposed between a ring and said ring carrier structure, and further including a second actuator for moving said ring carrier structure toward the container, said stop members limiting movement of said carrier structure upon engagement with a container and said second actuator continuing movement of said member of said releasing means toward the container.

2. Apparatus for assembling a cover clamping ring to the periphery of a drum-like container including: a frame; a ring carrier structure; first actuating means for moving said ring carrier structure toward and away from an end of a container relative to said frame; means on said carrier suspending a ring in a relaxed condition at a location spaced from a drum-like container; at least a pair of movable parts on said carrier engageable with a ring and movable to a position at which the ring is expanded; second actuating means for effecting movement of said parts to said position; and ring releasing means operative to eject said ring from said parts onto the container.

3. An apparatus of the type defined in claim 2 wherein said ring suspending means includes a plurality of holding members which suspend the ring vertically above the container when the ring is in a relaxed condition.

4. The apparatus defined by claim 2 wherein said ring suspending means includes holding members formed by magnets.

5. The apparatus defined by claim 2 wherein said ring carrier structure further includes at least one stop member extending therefrom and engageable with an end surface of a container to limit movement of said carrier structure, thereafter said means for releasing the ring is movable relative to said ring carrier structure.

6. Apparatus as defined in claim 2 wherein said movable parts engage an inner periphery of the ring and move to expand said ring, said ring releasing means including a member for engaging the ring and sliding the ring from said parts.

7. Apparatus as defined in claim 2 wherein said movable parts engage an inner periphery of the ring and move to expand said ring, said ring releasing means including a member for engaging the ring and sliding the ring from said parts.

References Cited

UNITED STATES PATENTS

| | | | |
|---|---|---|---|
| 985,803 | 3/1911 | Hodgkinson | 29—235 X |
| 2,086,371 | 7/1937 | Tear | 29—235 |
| 2,814,858 | 12/1957 | Erdmann | 29—229 |
| 3,036,371 | 5/1962 | Gray | 29—235 |
| 1,164,086 | 12/1915 | Gooding. | |
| 2,574,195 | 11/1951 | Sherrick | 29—235 X |
| 3,067,501 | 12/1962 | Baumann | 29—235 |

ROBERT C. RIORDON, Primary Examiner

J. C. PETERS, Assistant Examiner